United States Patent

Hoeting et al.

[11] Patent Number: 5,955,125
[45] Date of Patent: Sep. 21, 1999

[54] CONFECTIONARY HOLDER

[75] Inventors: Michael G. Hoeting; Sean T. Mullaney, both of Cincinnati, Ohio

[73] Assignee: Oddzon/Cap Toys, Inc., Pawtucket, R.I.

[21] Appl. No.: 08/684,313

[22] Filed: Jul. 17, 1996

[51] Int. Cl.⁶ .............................. A23G 1/00; A23G 3/00; G10D 13/08; A24F 15/04
[52] U.S. Cl. .............................. 426/104; 84/404; 84/402; 84/465; 446/409; 446/419; 446/408; 426/660; 221/24; 221/303; 221/306
[58] Field of Search .................................. 426/104, 660; 84/404, 402, 465; 446/409, 419, 408; D21/65; 221/24, 303, 306

[56] References Cited

U.S. PATENT DOCUMENTS

| | | | |
|---|---|---|---|
| D. 359,232 | 6/1995 | Diamond et al. | |
| 2,102,807 | 12/1937 | Perks | 273/138 |
| 2,417,664 | 3/1947 | Fischer | 161/23 |
| 2,532,116 | 11/1950 | Monaco | 46/175 |
| 3,138,249 | 6/1964 | Paulini | 206/47 |
| 3,800,443 | 4/1974 | O'Connell et al. | 35/35 |
| 4,034,499 | 7/1977 | Wild | 46/52 |
| 4,192,307 | 3/1980 | Baer | 128/252 |
| 4,294,168 | 10/1981 | Redhead | 99/494 |
| 4,343,475 | 8/1982 | Stader | 273/276 |
| 4,844,447 | 7/1989 | McKnight | 272/27 |
| 4,863,169 | 9/1989 | Miyazaki | 273/109 |
| 5,212,331 | 5/1993 | Waldo | 84/404 |
| 5,385,267 | 1/1995 | Diamond et al. | 221/248 |
| 5,505,114 | 4/1996 | Lawson | 84/404 |
| 5,540,353 | 7/1996 | Coleman et al. | 221/24 |

OTHER PUBLICATIONS

The Nature Company's–Rain Stick.

*Primary Examiner*—W. Gary Jones
*Assistant Examiner*—Dianne Rees
*Attorney, Agent, or Firm*—Jane M. Marciniszyn

[57] ABSTRACT

The present invention relates to a confectionary holder which simulates the sound of rain as the holder is vertically positioned. The holder comprises a transparent tube having ends, two sides, and at least two sets of indents directed inward toward the center of the tube and one set of indents per side of the tube. Each indent has a peak, a peak depth, a sloping upper face, a sloping lower face, and between each indent is a space length. The peaks of said indents alternate from one side to the other side along the tube length. The angle of incline of each indent face and the length of the space between each indent are selected to allow rigid items, e.g., candy or gum, when placed in the holder, to create the sound of rain as the confectionary pieces flow downward dropping onto each indent face, sliding off each face, and moving from side to side from one end of the holder to the other end when the holder is vertically positioned. The holder is emptied through a small opening at one end and filled through an opening at the other end. The tube is manufactured by blow molding. A cap with an small opening and a plug are provided. The holder has a dispensing position and a storage position. The holder is blow molded from a rigid plastic that vibrates at a high frequency. The caps are manufactured by injecting molding.

20 Claims, 6 Drawing Sheets

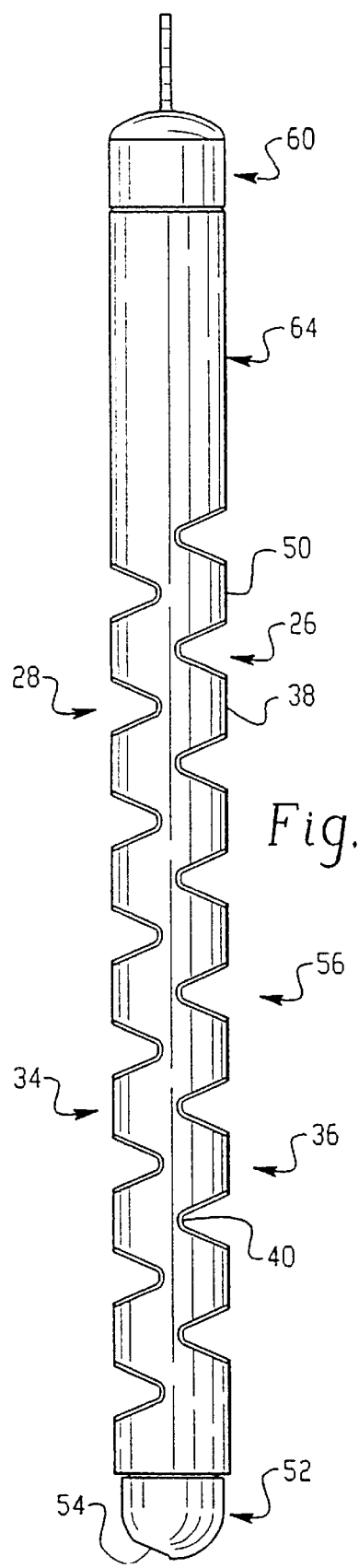
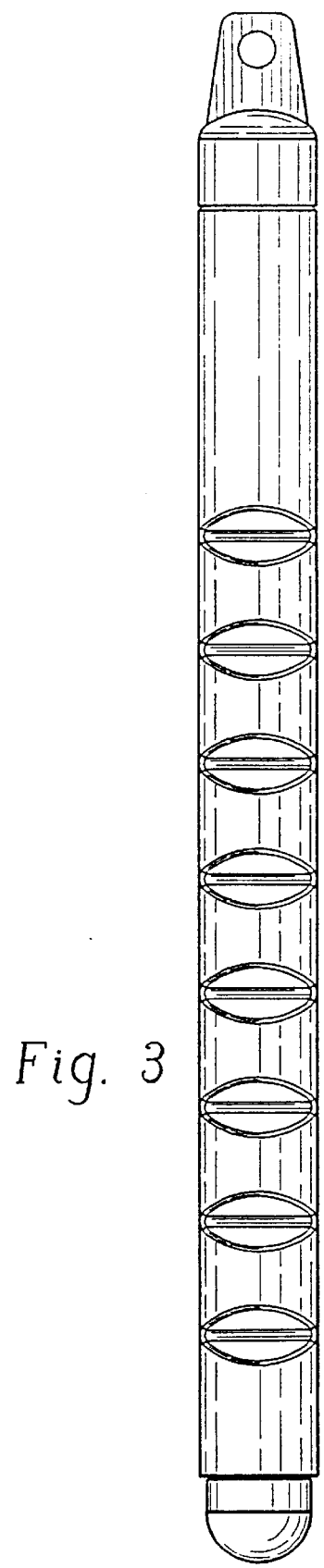
Fig. 2
Fig. 3

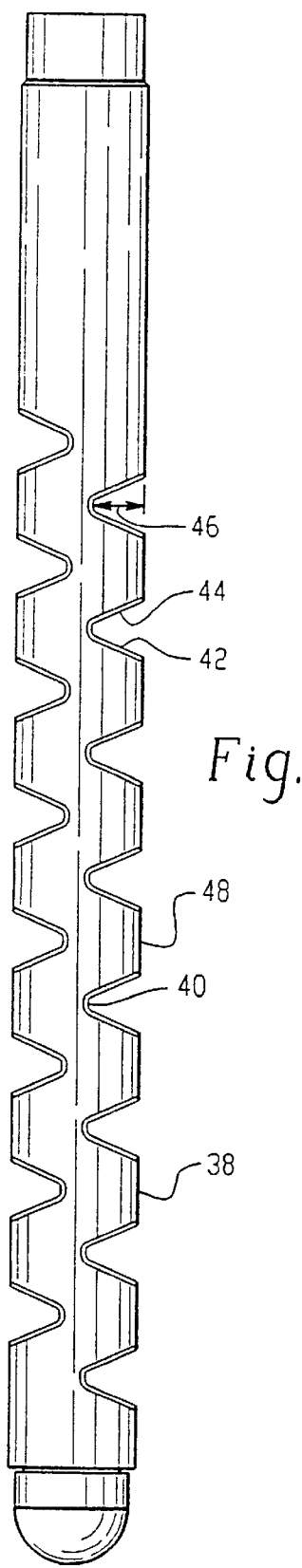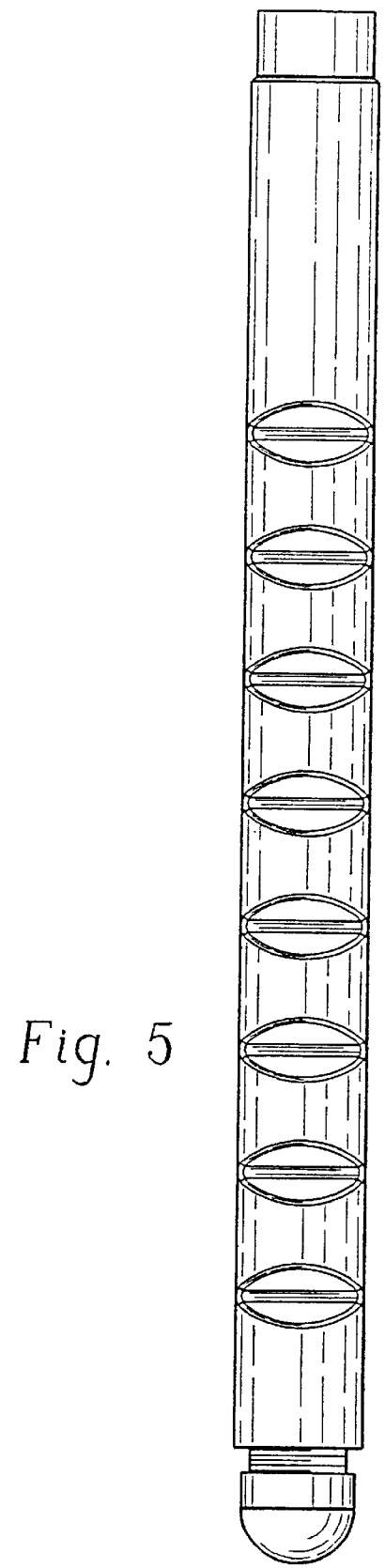

CONFECTIONARY HOLDER

TECHNICAL FIELD

The present invention relates generally to a toy device, and more particularly to a toy confectionary holder having at least two alternating sets of indents directed toward the center of the holder and spaces between the indents that simulates the sound of rain as confectionary pieces drop onto an indent face and slide off the face moving from side to side from one end of the holder to the other end when the holder is vertically positioned.

BACKGROUND OF THE INVENTION

It is well known that certain sounds are more pleasant to listen to than other sounds. The sound of ocean waves and the sound of rain are desirable to listen to as they are soothing sounds. The rain stick provides the sound of rain to listeners. The rain stick is a dried cactus in which the needles have been pushed inward so that the needles criss-cross in the center of the cactus. The cactus is partially filled with lava pebbles through a drilled opening in the top of the cactus which is then closed. When the rain stick is vertically positioned, the pebbles simulate the sound of rain as they bounce off the needles moving to the lower end of the stick.

Normally when confectionary pieces are placed in a holder, the confectionary pieces rattle as they move within the holder. Babies enjoy holding and shaking a rattle although the rattle does not contain confectionary pieces. U.S. Pat. No. 4,844,447 relates to a toy that provides a pleasing sound when bead-like objects fall through a generally cylindrical tubular body striking inwardly extending spokes. In the earthquake game, both noise and vibrations are created as a ball moves through a downwardly projecting tunnel having ridges in the bottom, U.S. Pat. No. 4,343,475. Using the objects usually found within these toys do not provide desirable and soothing sounds.

SUMMARY OF SAID INVENTION

Accordingly, said present invention provides a holder, said holder containing confectionary pieces which simulate said sound of rain when said holder is vertically positioned and said confectionary pieces move from one end of said holder to said other end. Said holder comprises a tube having two ends and two sides. The tube having at least two sets of indents directed toward said center of said tube and spaces between each indent. A set of indents is provided on each side of said tube. Each indent has a peak, a peak depth, an upper sloping face, a lower sloping face, and, between each indent, a space length. Said peaks of said first set of indents are spaced at alternate intervals from said peaks of said second set of indents. Said angle of incline of each face and said length of each space between said indents are selected to allow rigid items when placed in the tube to flow downward, dropping onto each indent face moving from side to side from one end of said holder to said other end thereby simulating the sound of rain when said holder is vertically positioned.

BRIEF DESCRIPTION OF THE DRAWINGS

FIG. 2 is a perspective view thereof, shown with caps;

FIG. 3 is a top plan view thereof;

FIG. 4 is a left side elevation view thereof, shown without caps;

FIG. 5 is a top plan view thereof;

BEST MODE FOR CARRYING OUT THE INVENTION

Figure 1:
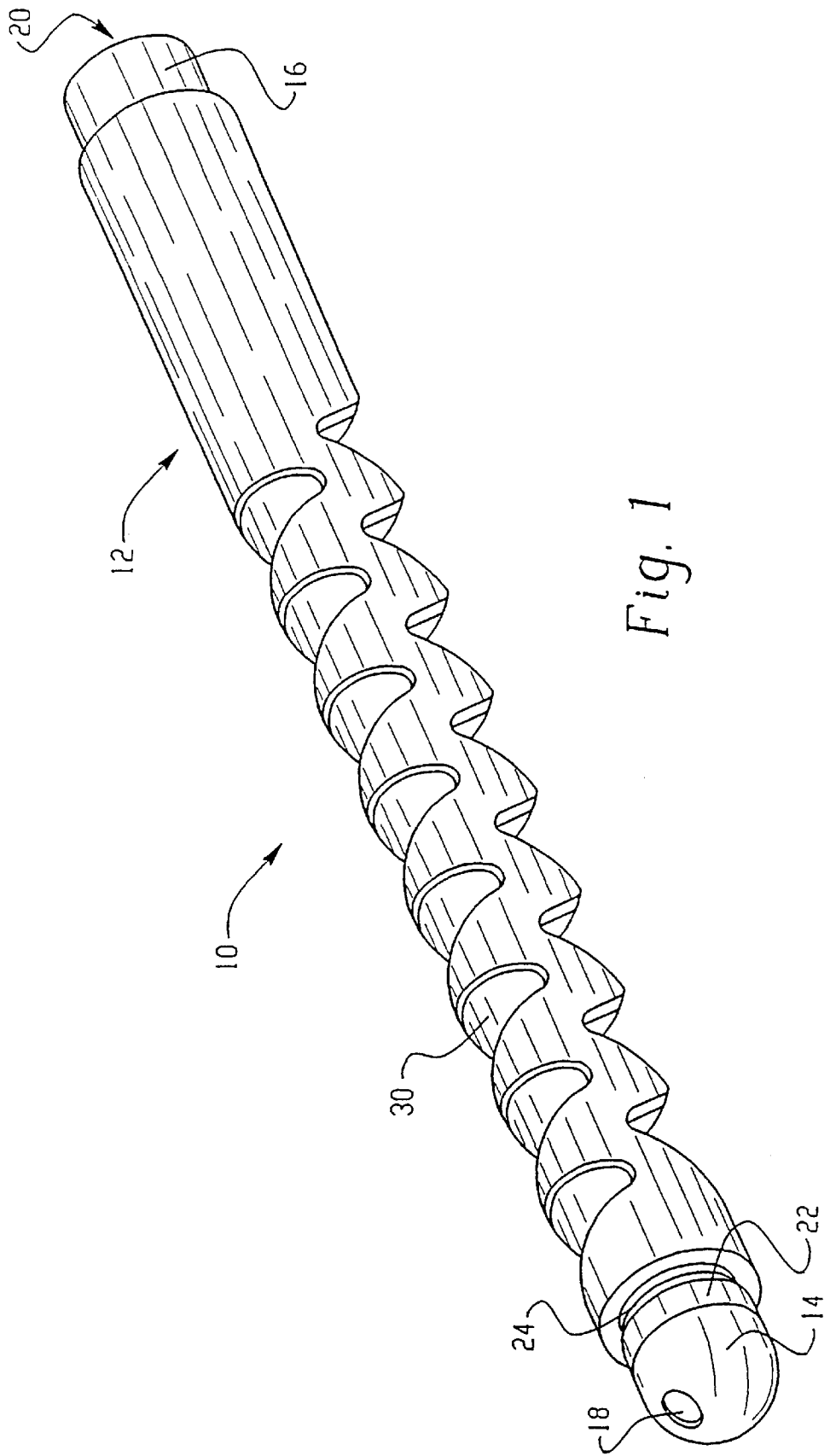
FIG. 1 is a perspective view of a preferred embodiment of a confectionary holder according to the present invention.
Figure 6:
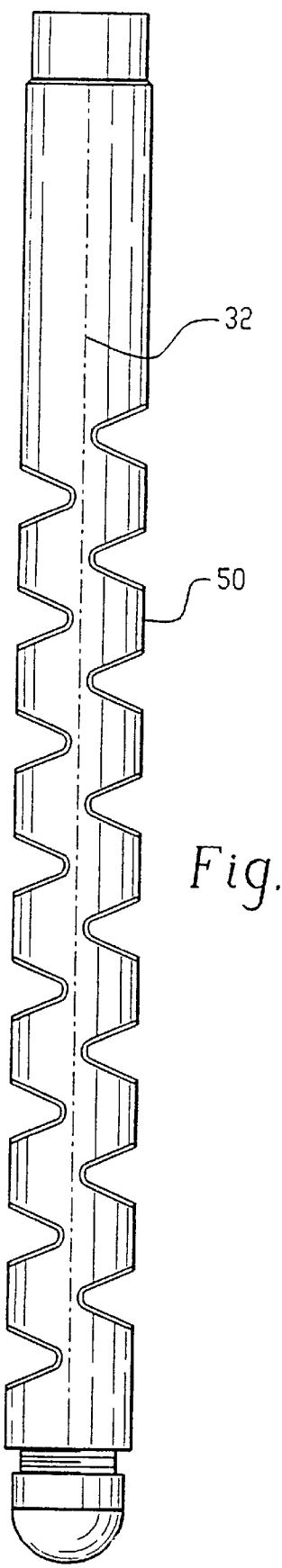
FIG. 6 is a right side elevational view thereof.
Figure 7:
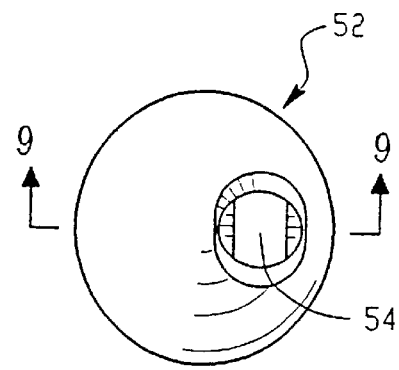
FIG. 7 is a top plan view of top cap.
Figure 8:
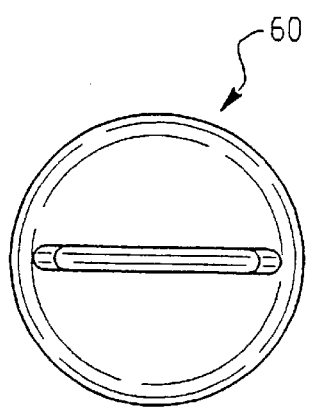
FIG. 8 is a top plan view of bottom cap.
Figure 9:
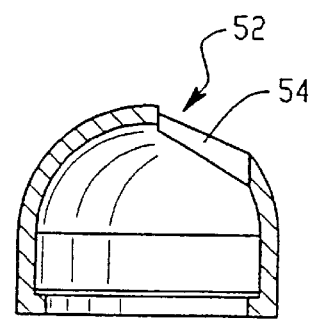
FIG. 9 is an sectional view of a top cap, along line 7—7 of FIG. 7.
Figure 10:
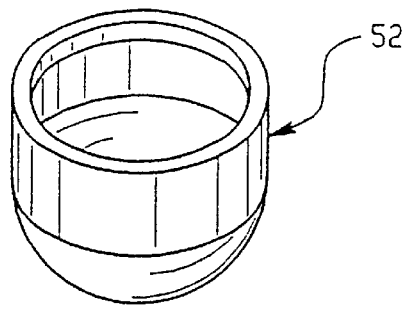
FIG. 10 is an inverted perspective view of a top cap.
Figure 12:
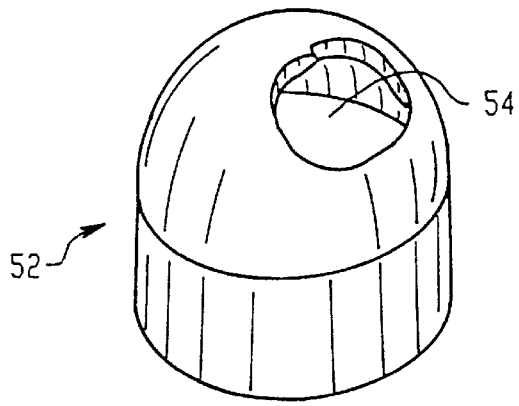
FIG. 12 is a side perspective view of said top cap.
Figure 13:
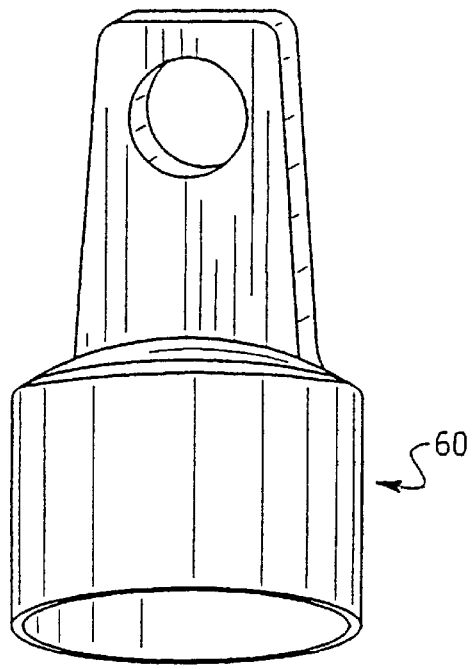
FIG. 13 is a perspective view of said bottom cap.
Figure 11:
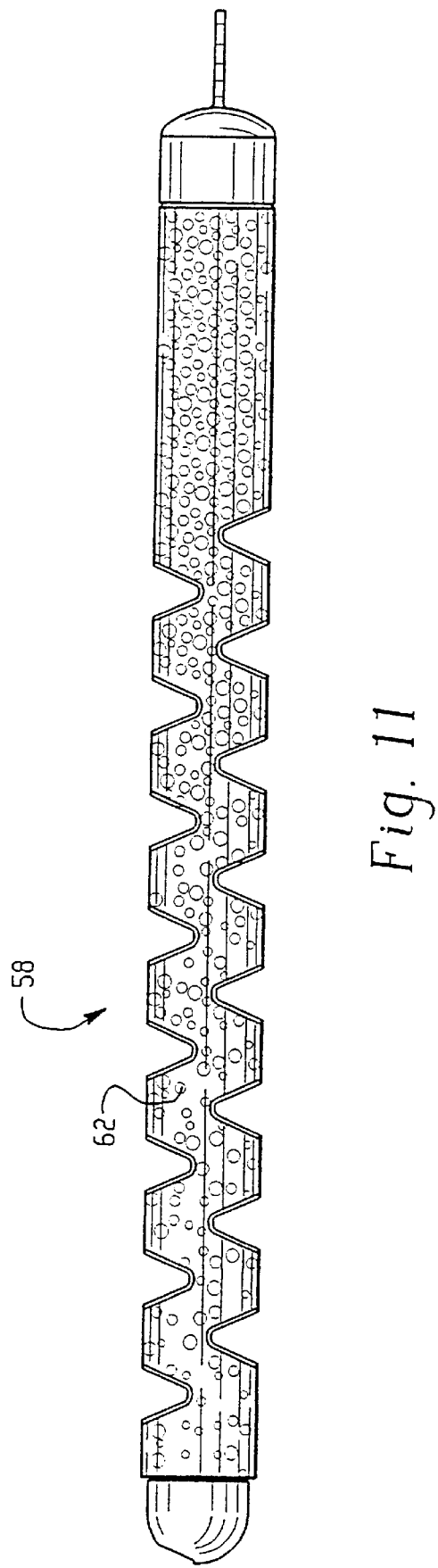
FIG. 11 is a side elevational view of said holder partially filled with confectionary pieces.

Referring now specifically to the drawings and in particular to FIGS. 1–13, there is illustrated therein a holder device in accordance with the present invention being generally designated at 10. As seen with reference to FIG. 1, holder 10 is a tube 12 having a top end 14 and a bottom end 16. Top end 14 has a small opening at 18 for small pieces of confectionary, i.e., candy or gum, to gradually drop out of said holder. Bottom end 16 is completely open 20 in order to fill or partially fill said holder with confectionary pieces. Top end 14 and bottom end 16 have a slightly reduced diameter. Above top end 14 of said tube 12 is a neck 22, which is reduced in diameter compared to said to end. Neck 22 can be threaded 24.

Tube 12 has at least two sets 26 and 28 of indents 30. Each indent 30 is directed toward the center 32 of said tube. One set 26 of indents is on one side 36 of said tube and said other set 28 of indents is along said other side 34 of said tube. Between each indent 30 is space 38. Each indent 30 has a peak 40, an upper face 42, a lower face 44, and a peak depth 46. Moving from said top end 14 to said bottom end 16 of said tube, said indents alternate from one side 34 to said other side 36. Each peak 40 is directed inward and toward space 38 positioned on said other side of said tube. When said peak depth 46 is less than the radius of said tube, said peak 40 is directed toward a mid-point 48 of said space length 50. The length of the space is dictated by the size of the confectionary used within. When said peak depth 46 is greater than the radius of said tube 12, said peak 40 is directed toward said space but not necessarily toward said mid-point 48. Upper face 42 and lower face 44 are sloped and can have substantially the same degree of incline or slope, i.e., preferably less than forty-five degrees.

Holder 10 can be made of glass, plastic, e.g., clear PVC, polycarbonate or clear ABS, or any other suitable material. When holder 10 is manufactured, it is desirable to blow mold a rigid plastic that vibrates at a high frequency. Holder 10 is transparent e.g., between three and eleven and a half inches long, between one-eighth and one inch in diameter and having at least two indents on each side. The ratio of the length to the diameter is at a minimum approximately 10:1.

A cap 52 having an opening 54 is provided for said top end 14. Cap 52 can snap onto said end 14 or can screw onto said threaded neck 24. Cap 52 is rotatable on said top end. The holder 10 has a storage position 56 and a dispensing position 58. When said opening 54 in said cap 52 and said opening 18 in said top end 14 are aligned, the holder 10 is in the dispensing position 58. When said opening 54 and said opening 18 are not aligned, said holder is in said storage position 56. A bottom plug 60 fits over said bottom opening 20. Plug 60 is removable for filling and refilling said holder 10 with confectionary pieces 62. The cap 52 and the plug 60 can be injection molded from low density PE.

Holder 10 is partially filled with confectionary pieces 62. Confectionary pieces are of a standard type being rigid and multi-colored. Each piece is small enough to fit easily through openings 18 and 54. Holder 10 is transparent in order to view the multi-colored confectionary pieces. A label can be positioned around the tube at 64.

When said holder is vertically positioned, the confectionary pieces 62 simulate the sound of rain as the confectionary pieces drop onto either of said upper face or said lower face of each indent and slides off of each face moving from side to side from one end of said holder to said other end of said holder. The confectionary pieces should flow freely through the holder, i.e., jamming of the confectionary is to be avoided.

EXAMPLE 1

A holder was made using polycarbonate and vacuum, forming each side of the tube, and glueing the halves together. The holder was ten and one-half inches long and one inch wide and had two sets of eight indents along each side. The indent peaks were directed toward the center of said tube, and said peak depth was less than the radius of said tube. The upper and lower faces had the same slopes, which were less than a forty-five degree angle. The confectionary pieces were multi-colored rigid pieces of gum approximately an eighth of an inch in length. The bottom opening was less than one inch in diameter, and the top opening was between one-eighth and three-fourth of an inch in diameter. The confectionary pieces partially filled said holder. When the holder was positioned vertically, the confectionary pieces quickly dropped by gravity hitting each indent face moving from side to side down the holder and sounded like rain.

Accordingly, the preferred embodiment of a device and method of manufacturing the device have been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

We claim:

1. A holder, said holder comprising a tube having two ends, two sides, and at least two sets of indents directed toward a center of said tube, one set of indents per side, wherein each indent has a peak, a peak depth, an upper sloping face, a lower sloping face, and between each indent a space length, wherein said peaks of a first set of indents are spaced at alternate intervals from said peaks of a second set of indents, wherein said tube is manufactured using a rigid plastic that vibrates at high frequency wherein an angle of incline of each face and said length of each space between said indents are selected to allow rigid items when placed in said tube to flow downward dropping onto each lower indent face moving from side to side from one end of said tube to an other end thereby simulating the sound of rain when said tube is vertically positioned with a top end down and wherein said upper and lower sloping faces are inclined at an angle compared to a perpendicular line drawn from a center axis of said tube through said indent peak.

2. The holder according to claim 1, wherein each indent peak on one side of said tube is directed substantially toward each midpoint of a space length immediately between said indent peaks on said other side of said tube.

3. The holder according to claim 1, wherein said upper and lower slopes of said indent faces have the same angle of incline.

4. The holder according to claim 1, wherein said peak depth of each indent is the same and less than the radius of said tube.

5. The holder according to claim 1, further including an opening in a bottom end for providing items to said tube.

6. The holder according to claim 1, further including an opening in a top end sized to allow items within said tube to pass out of said tube.

7. The holder according to claim 1, wherein tube length is in a ratio of 10:1 with tube diameter.

8. A confectionary holder that simulates the sound of rain when vertically positioned and partially filled with rigid pieces of confectionary, said holder comprising a substantially rigid plastic tube having a plurality of sloping indents directed toward a center of said tube and a tube length to tube diameter of approximately 10:1, and wherein said tube is manufactured using a rigid plastic that vibrates at high frequency.

9. A holder according to claim 8, wherein said plurality of indents is two sets of indents, a first set of indents on a first side of said tube with spaces between each indent, a second set of indents on a second side of said tube and opposing a space on said first side and with spaces between each indent of said second set of indents.

10. The holder according to claim 8, further including a dispensing opening at a top end and a filling opening in a bottom end.

11. The holder according to claim 8, wherein an upper and lower slope of each indent is at an angle of less than 50° when compared to a line drawn from a center axis of said tube through a center of an indent and a length of space between each indent is the same as a length of each indent.

12. A holder partially filled with pieces of confectionary, said holder comprising a transparent substantially rigid plastic tube having a first and second side, a top end, a bottom end, two sets of sloping indents directed toward a center of said tube, one set per side, wherein between each indent there is a space, wherein each indent has a depth less than the radius of said tube, wherein each slope angle of incline and length of said indents are the same, wherein each indent on a first side of said tube is directly opposite a space on a second side, wherein said holder comprises an opening in said top end for emptying the confectionary in said tube, an opening in said bottom end for filling said tube, and pieces of rigid confectionary, wherein said tube is manufactured using a rigid plastic that vibrates at high frequency, and wherein when said tube is vertically positioned said confectionary drops onto an indent face, slides off said indent face onto a lower indent face on the opposite side of said tube, said pieces moving from side to side down said tube simulating the sound of rain.

13. The holder according to claim 12, further including a rotatable cap with a small opening that fits onto said top end of said tube, and wherein said cap opening and top end opening align to define a dispensing position.

14. The holder according to claim 12, wherein each slope of each indent is less that 45° compared to a line drawn from a center axis of said tube through an indent.

15. The holder according to claim 14, wherein said tube length and diameter are in a ratio of 10:1.

16. The holder according to claim 12, wherein each indent has a peak that is directed toward a mid-point of a space of said other side of said tube.

17. The holder according to claim 14, wherein said tube is manufactured by blow molding polycarbonate.

18. The holder according to claim 1, wherein said tube is manufactured by blow molding polycarbonate.

19. The holder according to claim 8, wherein said tube is manufactured by blow molding polycarbonate.

20. The holder according to claim 8, wherein said slope of each indent has a 45° incline compared to a line drawn from a center axis of said tube through an indent.

* * * * *